Dec. 2, 1941.　　　B. O. AUSTIN ET AL　　　2,265,019

ENGINE SPEED CONTROL SYSTEM

Filed Jan. 24, 1940

WITNESSES:
James F. Young

INVENTORS
Bascum O. Austin and
Clarence A. Atwell.
BY
ATTORNEY

Patented Dec. 2, 1941

2,265,019

UNITED STATES PATENT OFFICE 2,265,019

ENGINE SPEED CONTROL SYSTEM

Bascum O. Austin, Forest Hills, and Clarence A. Atwell, Wilkinsburg, Pa., assignors to Westinghouse Electric & Manufacturing Company, East Pittsburgh, Pa., a corporation of Pennsylvania Application January 24, 1940, Serial No. 315,374

9 Claims. (Cl. 290—16)

Our invention relates generally to control systems, and more particularly, to systems for controlling the operation of Diesel or gas-electric vehicles.

In view of the inherent characteristics of electric generators of the type utilized for supplying current to the motors of Diesel or gas-electric vehicles, the engine, which drives the generator, overspeeds at low currents and the engine speed is held down too much at medium currents. However, the generator unloads and the engine overspeeds at high currents. The unloading of the generator results from the armature reaction and increased resistance drop at high currents which lowers the generator voltage, thereby reducing the kilowatt output of the generator and permitting the engine to overspeed.

One object of our invention, generally stated, is to provide for holding the engine speed approximately constant throughout the operating range of an engine driven equipment.

A more specific object of our invention is to regulate the speed of an engine which drives a generator by controlling the excitation of the generator.

Another object of our invention is to utilize operating characteristics of an engine driven generator for regulating the speed of the engine.

Other objects will be explained fully hereinafter or will be apparent to those skilled in the art.

According to our invention, the engine speed is regulated by controlling the generator excitation by means of a plurality of relays responsive to either the generator current or the generator voltage. The relays are set to operate in a predetermined sequence to vary the generator excitation, thereby controlling the load on the engine to regulate the engine speed.

For a fuller understanding of the nature and objects of the invention, reference may be had to the following detailed description, taken in conjunction with the accompanying drawing, in which.

Figure 1:
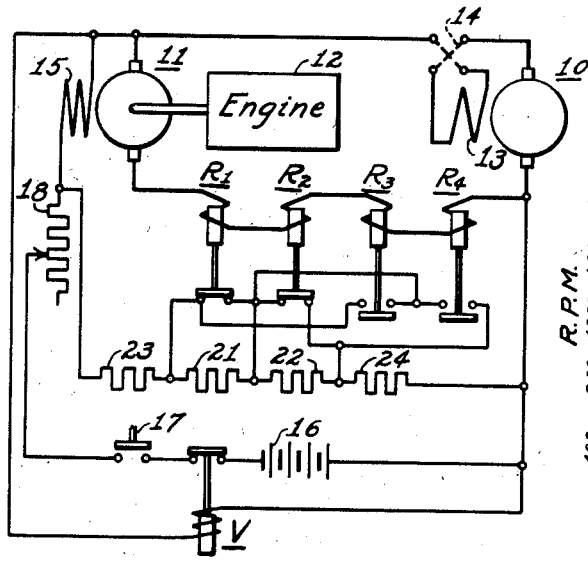
Figure 1 is a diagrammatic view of a control system embodying our invention.

Referring to the drawing, and particularly to Fig. 1, the system shown therein comprises a motor 10, a generator 11 for supplying current to the motor and an internal combustion engine 12 for driving the generator 11. The motor 10 is preferably of the series type suitable for propelling a bus or other vehicle and is provided with a series field winding 13 and a reversing switch 14 for reversing the direction of rotation in the usual manner. The generator 11 is provided with a shunt field winding 15 which is normally energized by the generator.

In order to cause the generator potential to build up quickly when the engine is accelerated, a battery 16 is connected in the circuit for the field winding 15 by means of a switch 17 which may be operated in conjunction with the accelerator or throttle for the engine 12. When the generator potential reaches a predetermined value, a relay V is operated to disconnect the battery 16 from the field winding 15. A variable rheostat 18 may be utilized to adjust the current supplied to the field winding 15 by the battery 16.

As explained hereinbefore and illustrated by the engine operating curves shown in Fig. 3, the engine overspeeds at light loads and the speed is held down below the preferred operating speed at medium loads. Furthermore, the generator has a tendency to unload and permit the engine to overspeed at high currents.

Figure 4:
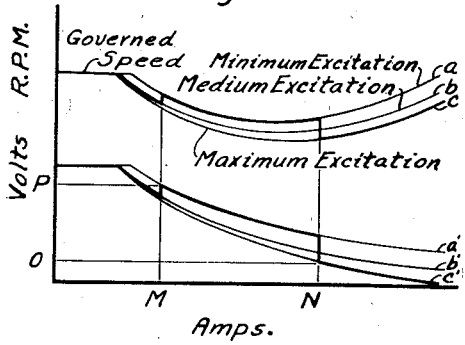

In order to correct the foregoing undesirable characteristics of the engine and generator, automatic regulation of the engine speed is obtained by controlling the excitation of the generator in accordance with operating characteristics of the generator. As shown by the curves $a$, $b$, and $c$ in Fig. 4, the engine speed may be controlled by varying the excitation of the generator. In Fig. 4, the curve $a$ represents the engine speed for minimum excitation of a particular machine. The curve $b$ shows the speed for medium excitation, and the curve $c$ for maximum excitation. Thus, it will be seen that the speed of the engine can be either increased or decreased by changing the excitation at the desired times.

In the system shown in Fig. 1, a plurality of relays R1, R2, R3 and R4, which are responsive to the generator armature current, are utilized for adjusting the external resistance in the shunt field circuit of the generator 11 in accordance with the load currents. Since the conventional engine speed curve has a reversed bend, as shown in Fig. 3, it is necessary to set one-half of the series current relays to operate their contact members to shunt resistance out of the generator field circuit in a predetermined order on heavy currents to prevent the generator from unloading and the engine overspeeding at high current values. The remaining one-half of the current responsive relays are set to close their contact members on low currents, thereby shunting the resistance out of the shunt field circuit to cause the generator to take load and decrease the engine speed at low current values.

Therefore, in the particular embodiment of the invention shown, the relays R1 and R2 have normally closed contact members which shunt resistors 21, and 22, respectively, from the circuit for the shunt field winding 15. The relays R3 and R4 have normally open contact members which are closed to shunt the resistors 21 and 22 from the field winding circuit when the relays are energized by predetermined currents. Additional resistors 23 and 24 may be provided in the field winding circuit for adjusting the field current.

By way of illustration, it may be assumed that the relay R1 is adjusted to open its contact members at 300 amperes which is approximately the current at which the engine has a tendency to drop below the normal operating speed of 1800 R. P. M., as shown by the curves in Fig. 3. Therefore, the engine speed may be held at approximately 1800 R. P. M., when the generator is delivering from 300 to 400 amperes, by opening the contact members of the relay R1 to insert the resistor 21 in the field winding circuit and causing the load taken by the generator to decrease. Likewise, the relay R2 may be adjusted to open its contact members at 400 amperes to insert the resistor 22 in the field winding circuit, thereby further decreasing the load taken by the generator 11 which enables the engine to maintain its normal operating speed.

Figure 3:
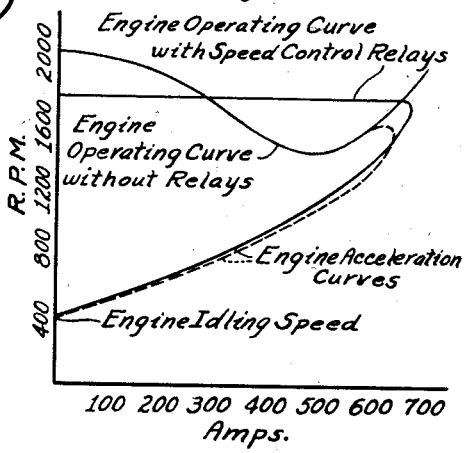
Figs. 3 and 4 are curves showing operating characteristics of the machines illustrated in Figs. 1 and 2.

In the event that the generator current increases to 500 amperes, at which point the generator has a tendency to unload and permit the engine speed to increase, as shown by the curve in Fig. 3, the relay R3 is operated to close its contact members, thereby shunting the resistor 21 from the field winding circuit which increases the excitation on the generator, causing it to take additional load to hold the engine at its normal speed. In a similar manner, the relay R4 may be set to close its contact members at 600 amperes to shunt the resistor 22 from the field winding circuit to increase further the load taken by the generator.

In this manner, the excitation of the generator 11 may be so controlled by the current responsive relays that the engine speed will be held approximately normal, as shown by the curve in Fig. 3 which represents the characteristics of an engine having speed control relays of a type herein disclosed. Thus the relays R1, R2, R3, R4 function to control the generator excitation in accordance with the load current and are so operated that the excitation is increased when the engine has a tendency to overspeed and is decreased when the engine is operating below its normal speed, thereby so controlling the load on the engine that it can maintain its normal operating speed. As explained hereinbefore, the relay V, which is responsive to the generator potential, is utilized to increase the excitation in order to cause the generator to build up its potential more quickly when the engine is being accelerated.

Figure 2:
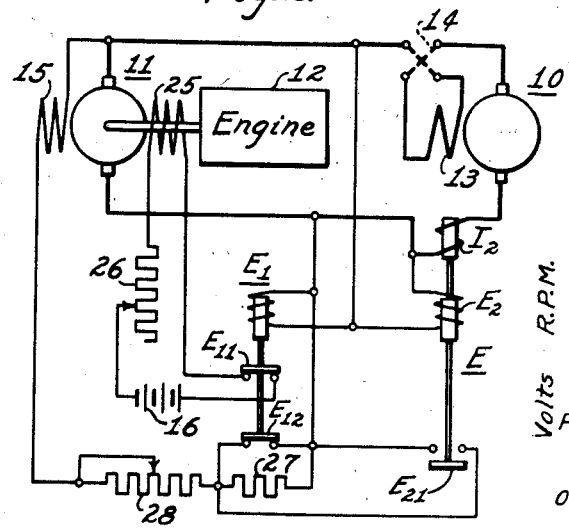
Fig. 2 is a diagrammatic view of a modification of the invention.

In the modification of the invention shown in Fig. 2, in which like parts are designated by the same reference characters as in Fig. 1, the generator 11 is provided with a separately excited field winding 25 in addition to the shunt field winding 15. The field winding 25 is energized from the battery 16, and a rheostat 26 may be utilized to adjust the current supplied by the battery 16.

The curves in Fig. 4 illustrate the variation in the speed and volts of a typical engine-driven generator when the ampere output is varied. Thus, the curves $a$ and $a'$ show the variation in speed and voltage with a minimum amount of excitation; the curves $b$ and $b'$ illustrate the operation with a medium amount of excitation, and the curves $c$ and $c'$ are for maximum excitation of the generator.

It will be noted that the voltage decreases with an increase in the armature current of the generator and that the speed of the engine decreases for medium amounts of current, but increases at relatively high currents. The increase in engine speed results from the decrease in the terminal voltage of the machine, which is caused by the armature reaction and increased resistance drop at high currents, thereby actually decreasing the total power output of the generator which decreases the load on the engine and permits its speed to increase.

In the system shown in Fig. 2, the excitation of the machine is controlled by a relay E1 which is responsive to the generator voltage, and an additional relay E having a potential coil E2, also responsive to the generator voltage, and a current coil I2 which is responsive to the generator current. The relay E1 is provided with contact members E11, which disconnect the battery 16 from the field winding 25, and additional contact members E12, which shunt a resistor 27 from the circuit for the shunt field winding 15. The relay E is provided with contact members E21 which also shunt the resistor 27 from the circuit for the field winding 15. An adjustable rheostat 28 is provided for manual adjustment of the current in the field winding 15.

Referring to the curves in Fig. 4, and assuming that the machines are operated at heavy currents on the curves $c$ and $c'$, which represent maximum excitation conditions, the relay E1 is operated when the voltage O is reached to open its contact members E11 to disconnect the battery 16 from the field winding 25. The contact members E12 are also opened at this time to insert the resistor 27 in the circuit for the field winding 15, thereby reducing the excitation on the generator to its minimum value and causing the machines to operate on the curves $a$ and $a'$, as shown by the heavy lines on the curves. When the voltage P is reached as a result of the current being reduced to the value M, the coil E2 overcomes the magnetic effect of the coil I2 on the relay E and closes the contact members E21, thereby shunting the resistor 27 from the circuit for the field winding 15 and causing the machines to operate on the curves $b$ and $b'$ until a speed is attained at which the governor functions to control the engine speed.

It will be seen that the resultant engine speed over the operating range is much more constant than if the machines were operated on any one value of field excitation, and that in this manner the engine speed may be held approximately constant throughout the operating range. It should be noted that the changes in speed and voltage in actual operation will not be as abrupt as indicated by the heavy line, since the inertia of the rotating parts and the magnetic inertia of the shunt and battery excited fields tends to smooth out the changes in the characteristics of the machines.

From the foregoing description, it is apparent that we have devised a system which provides for regulating the engine speed throughout the operating limits of equipment of the type shown and improves the overall performance of Diesel or gas-electric drive equipment, since the engine speed is so controlled that it produces its maximum output over the load range of the equipment. Furthermore, the systems herein described are relatively simple and only require the use of relays of a standard design, well-known in the electrical art. The present systems do not require the use of additional auxiliary machines for regulating the speed of the power machines utilized in the system.

Since numerous changes may be made in the above described construction and different embodiments of the invention may be made without departing from the spirit and scope thereof, it is intended that all matter contained in the foregoing description or shown in the accompanying drawing shall be interpreted as illustrative and not in a limiting sense.

We claim as our invention:

1. In a control system, in combination, a motor, a generator for supplying current to the motor, an engine for driving the generator, means for exciting the generator, a resistor for controlling the generator excitation current and relay means responsive to operating characteristics of the generator for alternately shunting said resistor, thereby varying the generator excitation to regulate the engine speed.

2. In a control system, in combination, a motor, a generator for supplying current to the motor, an engine for driving the generator, means for exciting the generator, a resistor for controlling the generator excitation current and a pair of relays responsive to operating characteristics of the generator for alternately shunting said resistor, thereby varying the generator excitation to regulate the engine speed.

3. In a control system, in combination, a motor, a generator for supplying current to the motor, an engine for driving the generator, means for exciting the generator, a resistor for controlling the generator excitation current and a pair of relays disposed to operate in sequential relation to alternately shunt said resistor to vary the generator excitation, thereby regulating the engine speed.

4. In a control system, in combination, a motor, a generator for supplying current to the motor, an engine for driving the generator, means for exciting the generator, a resistor for controlling the generator excitation current, and relay means responsive to the generator current and voltage for alternately shunting said resistor, thereby varying the generator excitation to regulate the engine speed.

5. In a control system, in combination, a motor, a generator for supplying current to the motor, an engine for driving the generator, means for exciting the generator, and a plurality of relays responsive to the generator current and operable in a predetermined sequence for alternately increasing and decreasing the generator excitation to regulate the engine speed.

6. In a control system, in combination, a motor, a generator for supplying current to the motor, an engine for driving the generator, means for exciting the generator, and a plurality of relays responsive to different values of generator current for alternately increasing and decreasing the generator excitation to regulate the engine speed.

7. In a control system, in combination, a motor, a generator for supplying current to the motor, an engine for driving the generator, means for exciting the generator, and a plurality of relays responsive to the generator voltage and operable in a predetermined sequence for alternately increasing and decreasing the generator excitation to regulate the engine speed.

8. In a control system, in combination, a motor, a generator for supplying current to the motor, an engine for driving the generator, means for exciting the generator, and a plurality of relays responsive to different values of generator potential for alternately increasing and decreasing the generator excitation to regulate the engine speed.

9. In a control system, in combination, a motor, a generator for supplying current to the motor, an engine for driving the generator, means energized by the generator for exciting the generator, an additional source of excitation for the generator, and relay means responsive to the current and the potential of the generator for alternately increasing and decreasing the total excitation supplied by said self-excited means and said additional source to regulate the engine speed.

BASCUM O. AUSTIN.
CLARENCE A. ATWELL.